Jan. 17, 1950
F. J. NAGEL
2,495,175
POLYHYDROXYBENZENE-FORMALDEHYDE ADHESIVE AND
PROCESS OF PREPARING AND EMPLOYING SAME
Filed Feb. 28, 1947
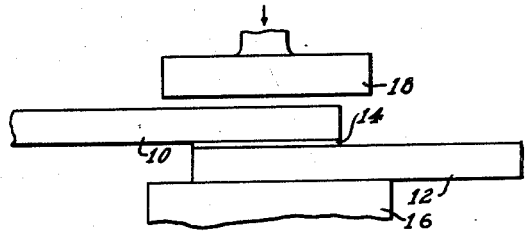
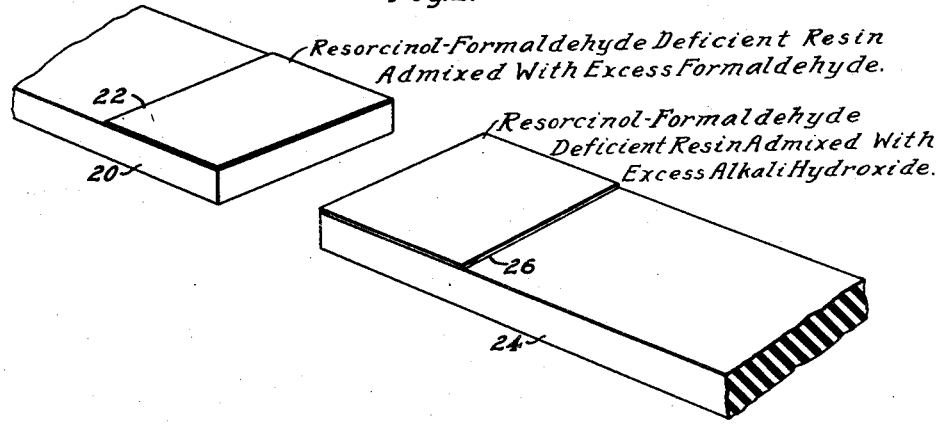
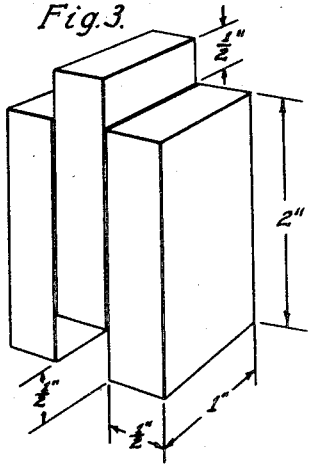
WITNESSES:
INVENTOR
Fritz J. Nagel.
BY
ATTORNEY Patented Jan. 17, 1950

2,495,175

UNITED STATES PATENT OFFICE 2,495,175

POLYHYDROXYBENZENE - FORMALDEHYDE ADHESIVE AND PROCESS OF PREPARING AND EMPLOYING SAME

Fritz J. Nagel, Pittsburgh, Pa., assignor to Westinghouse Electric Corporation, East Pittsburgh, Pa., a corporation of Pennsylvania Application February 28, 1947, Serial No. 731,518

7 Claims. (Cl. 154—140)

This invention relates to adhesives or cements comprising partially reacted polyhydroxybenzene-formaldehyde compositions which will thermoset at room temperatures in short periods of time.

It is desirable to have a thermosettable resinous adhesive capable of setting at room temperatures in a few hours or less, the adhesive being substantially neutral in reaction and possessing a high bond strength. It is known to prepare resinous compositions for adhesive use which will thermoset when heated to temperatures of 200° F. or higher. However, these prior art resinous compositions are usually unsatisfactory as adhesives when employed at room temperature unless extremely long periods of time are employed. Furthermore, many of the resinous adhesives employed at the present time require the use of strong acids or strong alkalies as catalysts to facilitate hardening to a thermoset state and the strong acids or alkali present in the bonded joint will in time react with many materials being bonded to weaken the joint so that the life is unsatisfactory.

The object of this invention is to provide for bonding laminations or the like with a substantially neutral polyhydroxybenzene-formaldehyde resin capable of thermosetting at a temperature of 70° F. in a period of time of the order of one hour.

A further object of the invention is to provide a resinous composition deficient in formaldehyde which is highly stable and which can be converted to a highly reactive thermosettable adhesive by introducing enough formaldehyde to correct the deficiency thereof along with sufficient alkali to render the composition substantially neutral.

A still further object of the invention is to provide processes for applying a polyhydroxybenzene-formaldehyde adhesive to members to provide a rapid and convenient method of bonding the members at room temperature in short periods of time.

Other objects of the invention will in part be obvious and will in part appear hereinafter. For a better understanding of the nature and objects of the invention, reference should be had to the following detailed specification and drawing, in which:

Figure 1 is a fragmentary view in elevation of a bonding apparatus illustrating the method;

Fig. 2 is a view in perspective partly in broken section of a modified form of practice of the invention, and Fig. 3 is a view in perspective of a test specimen.

In my copending patent aplication Serial No. 639,431, filed January 5, 1945, now Patent No. 2,477,641, August 2, 1949, which is a continuation in part of application Serial No. 519,189, now abandoned, filed January 21, 1944, there is disclosed the preparation of 1,3-polyhydroxybenzene-formaldehyde reaction products having sufficient formaldehyde to render them thermosetting on heating a substantial amount above room temperature (above about 50° C.). However, at room temperature the compositions are so stable and relatively non-reactive that they cannot be rendered suitable for use as cold-setting adhesives. In the present invention, it has been found that the resinous reaction product of polyhydroxybenzene and a molar deficiency of formaldehyde is extremely stable and non-reactive at room temperature and higher, as well as being non-thermosetting. However, on adding sufficient formaldehyde to render this latter reaction product thermosettable and an alkali metallic hydroxide, the reaction product is no longer stable, but is rendered highly auto-reactive both at room temperature and at higher temperatures. It possesses outstanding adhesive properties.

More specifically, there is initially prepared a stable resinous reaction product of one mole of a 1,3-polyhydroxybenzene and from 0.5 to 0.8 mole of formaldehyde or a polymer of formaldehyde, the formaldehyde being insufficient to produce a thermosetting resin, and thereafter at the time of use adding the deficiency of formaldehyde and sufficient of a hydroxide selected from the group of alkali metal and alkaline earth metal hydroxides to render the composition highly auto-reactive at room temperatures of the order of 70° F. so that the resin will thermoset and bonding will take place in one-quarter hour or longer. Proportional decreases in curing time will occur on heating to elevated temperatures.

More specifically, I react under substantially anhydrous conditions from 0.5 to 0.8 mole of formaldehyde or a polymer of formaldehyde with each mole of a polyhydroxybenzene having the unit formula

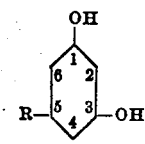

where R is a radical selected from the group consisting of hydrogen, hydroxyl, halide, carboxyl, aliphatic hydrocarbon and aryl radicals and having not more than one substituent for hydrogen in the 2,4,6 positions. Examples of suitable polyhydroxybenzene having the above unit formula are resorcinol, orcinol (5-methyl-1,3-dihydroxy benzene), pyrogallol (1,2,3-trihydroxy benzene), 1,3-dihydroxy-4-chlorobenzene, alpha-resorcylic acid (3,5-dihydroxy benzoic acid) and phloroglucinol (1,3,5-trihydroxy benzene).

For controllably reacting with the polyhydroxy benzene having the above unit formula, it is necessary to employ substantially anhydrous formaldehyde or an anhydrous polymer of formaldehyde and effect the reaction in the absence of any substantial amount of water. Exceptionally good results have been obtained with paraformaldehyde. Other polyoxymethylenes substantially free from any water may be employed in the practice of the invention. The polyhydroxy benzene must be substantially anhydrous.

The reactiton of a polyhydroxy benzene having the unit formula

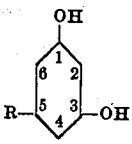

as above described, with substantially anhydrous formaldehyde or its polymers may be controllably conducted only in the presence of substantially anhydrous solvent composed of a certain minimum of methanol as the critical ingredient. By substantially anhydrous methanol is meant methanol with less than 2% water preferably comprising 99% to 100% pure methanol. The anhydrous methanol must be present in an amount equal to at least 25% of the combined weight of the polyhydroxy benzene, formaldehyde and solvent. Best results have been obtained where the methanol comprises the entire solvent and is approximately 35% to 40% of the total weight of the reactants and solvent. Larger amounts of methanol may be employed with added benefits. The term "methanol" as employed herein refers to substantially anhydrous methanol.

It has been found that only anhydrous methanol enables the controlled reaction of a polyhydroxy benzene and formaldehyde or a polymer formaldehyde in any size batch, for example, 1000 gallons, with all the ingredients admixed together rapidly at one time without undesirable overheating taking place. It is well known that the reaction of a 1,3-polyhydroxy benzene formaldehyde is extremely violent and ordinarily cannot be conducted with adequate control or the production of overreacted resin unless exceptional cooling is available or the ingredients are combined in small portions with each other, thereby prolonging the reaction and time considerably.

For producing the base resinous reaction product, one mole of a 1,3-polyhydroxy benzene such, for example, as resorcinol, is combined with from 0.5 to 0.8 mole of anhydrous formaldehyde or a polymer thereof, such as paraformaldehyde. Optimum adhesive strength has been secured when 0.65 mole of formaldehyde has been reacted with each mole of resorcinol. These proportions will produce a relatively non-thermosetting resinous product characterized by high stability.

An alkaline catalyst is required for promoting the reaction of the 1,3-polyhydroxy benzene and the formaldehyde to a resinous condition for use in the present invention. The amount of the alkaline catalyst may vary from 0.01% to 1% based on the weight of the polyhydroxy benzene. Examples of suitable alkaline catalysts are ammonium hydroxide, aniline, ethylene diamine, sodium hydroxide, potassium hydroxide, calcium hydroxide, meta or para-phenylene diamine and hexamethylenetetramine. An acid catalyst has been found to give inferior results since in producing the final adhesive product the bond strength and life are not satisfactory.

While the anhydrous solvent employed as the reaction medium must contain methanol as the critical ingredients, it is desirable to add other low boiling point non-reactive solvents that are stable in the presence of formaldehyde and the polyhydroxy benzene, providing the boiling point of such added solvent does not exceed 100° C. and that the reflux temperature does not appreciably exceed 100° C. Anhydrous ethanol, isopropanol, n-butanol, ethyl acetate, n-butyl acetate and ethyl propionate may be combined with the methanol for this purpose. In any event, the proportion of methanol to the entire reaction mixture including the solvent should be at least 25%, higher proportions giving a correspondingly better product with regard to stability, as well as easier reaction control. The other components of the solvent, other than methanol, act as diluents and do not appreciably contribute to the control of the reactivity of the polyhydroxy benzene and formaldehyde.

The following examples, in which all parts are by weight, illustrate the preparation of the 1,3-polyhydroxybenzene-formaldehyde resins of this invention as low polymers in the A-stage.

*Example I*

|  | Moles |
|---|---|
| Resorcinol, 440 parts | 4 |
| Paraformaldehyde, 78 parts | 2.6 |
| Methanol, 250 parts | |
| Concentrated ammonium hydroxide, ½ part | |

The ingredients were combined by placing the methanol in a closed reaction vessel adding the resorcinol and then introducing all the paraformaldehyde in one batch. The reaction vessel was equipped with a mechanical stirrer, reflux condenser, heating and cooling means, and the usual controls. The mixture was refluxed with constant stirring for 10 minutes during which time the temperature rose to from 75° C. to 85° C. then 100 parts of the methanol was distilled off at atmospheric pressure over a period of 30 minutes, the temperature not exceeding 85° during this operation. The reaction was complete at this time and was terminated by cooling the exterior of the reaction vessel. The resulting product was a resin solution which was extremely stable at atmospheric temperatures and could be stored indefinitely.

Example II

|  | Moles |
|---|---|
| Resorcinol, 880 parts | 8 |
| Paraformaldehyde, 156 parts | 5.2 |
| Methanol (99% to 100%), 400 parts | |
| Concentrated ammonium hydroxide, ½ part | |

After combining the ingredients as in Example I, the reflux time was 10 minutes. Thereafter the methanol was distilled off for 30 minutes until 180 parts was removed. The temperature did not exceed 90° C. at any time. The viscosity of the resulting resin solution produced was somewhat lower than that of Example I but was equal to it in stability and in suitability for subsequent use in preparing an adhesive.

Example III

|  | Moles |
|---|---|
| Resorcinol, 440 parts | 4 |
| Paraformaldehyde, 96 parts | 3.2 |
| Methanol (99% to 100%), 250 parts | |
| Sodium hydroxide, ¼ part | |

The reflux time of the ingredients in the reaction vessel was 5 minutes. 100 parts by weight of the methanol was removed by distillation over a period of time of 20 minutes. The temperature did not exceed 88° C. at any time during the reaction. A stable resinous solution was produced.

In my copending patent application Serial No. 639,431, filed January 5, 1945, there are disclosed other polyhydroxybenzene-formaldehyde reaction products having an adequate proportion of formaldehyde to be thermosetting. By reducing the proportion of formaldehyde to from 0.5 to 0.8 mole per mole of polyhydroxy benzene in Examples V to VIII of that application, the resulting solutions may be used for the purpose of the present invention.

In Examples I to III the methanol or solvent need not be distilled off, but refluxing should be continued over the entire period if no methanol is removed. The reaction of the 1,3-polyhydroxy benzene and paraformaldehyde may be carried out for from ½ hour to 1½ hours or even longer. A slight increase in the molecular weight of the polymer produced will be secured with longer reaction times. However, ½ hour reaction time has been found to produce an excellent composition for use in the practice of the invention.

In order to prepare an adhesive therefrom, the stable resinous compositions, such as produced in the preceding Examples I to III, are admixed with additional formaldehyde or a polymer of formaldehyde and an alkali hydroxide at the time of use. The proportion of formaldehyde or a polymer of formaldehyde capable of liberating formaldehyde under the conditions or temperatures of use added to the resinous composition should be sufficient to provide a total of from 0.9 to 1.5 moles of formaldehyde including the originally reacted formaldehyde per mole of polyhydroxy benzene to insure a thermosetting resinous adhesive being attained. The composition, however, is not reactive at room temperature unless there is also included a hydroxide selected from the group consisting of alkali metal and alkaline earth metal hydroxides in an amount sufficient to provide a pH of from 6.8 to 7.5. Greater amounts of hydroxide will develop a higher pH and will expedite the curing or setting of the adhesive, and these may be desired for this reason. In some cases, sufficient hydroxide to produce a pH of 9 may be introduced for preparing extremely fast setting adhesives. Examples of suitable hydroxides are sodium hydroxide, potassium hydroxide, cesium hydroxide, barium hydroxide and lithium hydroxide. The amount of hydroxide may be from 0.1% to 5% based on the weight of the resinous reaction product proper. From 1% to 2% of hydroxide based on the weight of the resinous solids has given a composition having a pH of from 6.8 to 7.5, with good sharp or working life and a reasonably short bonding time at room temperature. With a maximum of 5% of hydroxide, the reaction time is about 15 minutes at 70° F. and only a few seconds at 80 or 90° C.

The following examples illustrate the preparation of the adhesive composition proper.

Example IV

The resinous reaction product of Example II in an amount providing 100 parts by weight of resin, excluding the weight of the solvent, is admixed with 24 parts by weight of 37% aqueous formaldehyde and 7 parts by weight of a solution prepared by admixing one part of solid sodium hydroxide and 2 parts of water. The composition is ready for use as an adhesive after thorough mixing. The composition is quite fluid and may be applied to members, such as flat laminations or other shaped members to be bonded by brushing, spraying, dripping, or, in the case of sheet material, such as paper or cloth, by spreading with a doctor blade or the like. The amount of coating applied may be of approximately 20 pounds per thousand square feet on a relatively non-porous surface such, for example, as present in phenolic laminates or metal sheets. More porous materials, such as wood, may require 40 pounds of the composition per thousand square feet of the composition. Fabrics may require even greater or lesser amounts which may be applied in accordance with the requirements of the job.

The coated members are superimposed, preferably after a brief drying treatment to remove excess water, methanol and any other volatile solvent. The composition has a working life of approximately 4 hours at room temperature (24° C.). With other proportions of alkali hydroxide, the working life will vary from this value. Therefore, the coated members should be dried, superimposed and pressed within this time to secure the best bonds. The superimposed members are subjected to a pressure of more than 10 pounds per square inch, preferably from 25 pounds per square inch to 250 pounds per square inch. Porous members, such as veneers to be made into plywood, may be subjected to the higher pressures while non-porous materials, as sheets of cured phenolic members are preferably compressed at pressures sufficient to bring the laminations into close contact without squeezing out substantial quantities of the applied resinous coating. In from 6 to 24 hours at room temperature, the compressed members will be bonded with substantially the major proportion of the full strength of the resin bond being obtained and pressure may be relieved at such time. In about a week at room temperature, the ultimate strength of the resinous adhesive will be attained. If heat is applied to the superimposed and compressed materials being bonded with the adhesive, the conversion of the resin to the thermoset stage is completed in a much shorter period of time. Thus at 80° C., a period of 90 seconds will be sufficient to convert the resin to its fully cured state with a high proportion of the ultimate bond strength being secured.

The composition of this Example IV is substantially neutral possessing a pH of approximately 7. Therefore, there will be no deleterious subsequent reactions with practically all materials bonded therewith and the bond will be of substantially full strength for an indefinite period of time. The resinous composition is resistant to mold and bacteria. Phenolic laminates bonded with the composition have been boiled in water for one week without any observable deterioration in the strength of the bond. In fact, the bond strength usually increases slightly on such treatment.

It has been found that the addition of finely powdered nut shells, such as walnut shell or coconut shell flour, up to as much as the weight of the resin itself, enables the preparation of an adhesive having properties superior in many cases to those secured with the composition, such as in Example IV. The following examples illustrate this feature of the invention:

*Example V*

The resinous composition of Example II was admixed with walnut shell flour in the proportion of 100 parts of resin to 25 parts of the flour. When thoroughly mixed, it was combined with a previously mixed solution comprising 24 parts by weight of 37% aqueous formaldehyde and 10½ parts of sodium hydroxide solution comprising one part of solid sodium hydroxide to two parts of water. The entire mixture could be readily applied to members as an adhesive. The working life of the composition was approximately 4 hours. At room temperature (70° F.), it set to a gel in 6 hours and to a hardened infusible product in from 12 to 48 hours.

*Example VI*

The resin of Example III was combined with walnut shell flour in the proportion of 100 parts of the former to 50 parts of the flour. Thereafter, 5 parts by weight of paraformaldehyde and 10½ parts by weight of a sodium hydroxide solution composed of one part of solid sodium hydroxide and 2 parts of water were added. After thorough mixing, a syrupy adhesive resulted which was well suited for application to sheet materials in conventional glue applying machines.

*Example VII*

The resin of Example I was admixed with 10 parts of paraformaldehyde and 8 parts by weight of a solution composed of one part of potassium hydroxide and 2 parts of water. When thoroughly mixed, the composition was ready for application to members as an adhesive.

The adhesives prepared as described can be applied to many types of materials. For example, metals, as steel and copper, paper, cloth, phenolic bodies and laminates, wood, glass, rubber, and synthetic and natural resinous products may be bonded therewith.

Referring to Fig. 1 of the drawing, there is illustrated the method of making a lap joint with the resinous adhesives of this invention between two members 10 and 12, such as wood, phenolic laminates or the like. A layer 14 of the adhesive composition, such, for example, as one of the compositions set forth in Examples IV to VII is applied to one or both of the members 10 and 12, and preferably dried to remove the solvent and water present. The members 10 and 12 are superimposed as shown and placed on the relatively stationary base 16 and compressed with the movable head 18 applying a suitable pressure of above 10 pounds per square inch of the joint covered by the adhesive 14. At room temperature, the pressure may be removed in about 6 hours. If heat is applied to the base 16 and head 18, the time for securing a good bond may be reduced materially to as low as a fraction of a minute as disclosed herein. It will be appreciated that actual presses need not be employed but clamps or the like may be made use of.

In order to secure a longer working life or pot life, an alternative mode of combining the partially reacted resin, excess formaldehyde, and metal hydroxide may be practiced. Referring to Fig. 2 of the drawing, there are shown the members 20 and 24 which are to be bonded with an overlapped joint. The joint surface of the member 20 is coated with a layer 22 composed of the partially reacted polyhydroxybenzene-formaldehyde resin carrying sufficient formaldehyde to provide a total of from 0.9 to 1.5 moles thereof for double the amount of resin present in the layer 22. The layer 26 on the member 24 is composed of the same resin but carrying double the required amount of metal hydroxide required for the layer 26. By superimposing the members 20, the layers 22 and 26 are in contact and upon applying the required pressure a mechanical intermingling of the excess formaldehyde and excess metal hydroxide between the respective layers will occur and a reaction will take place causing both of the layers of resin to become thermoset. The time for reaching the thermoset state will be substantially that required if the layers were each provided with sufficient formaldehyde and hydroxide to begin with. However, the mixture of which layer 22 is composed has a very long life at room temperature, of the order of one month, and the mixture of which layer 26 is composed has a similarly long working or pot life at room temperature. This enables the respective compositions to be prepared and stored in the shop in quantity without the necessity of considering working life as is required with the mixtures of Examples IV to VII.

By preparing and applying adhesive compositions in accordance with the present invention, there are secured bonds of great strength, superior to those produced with any other known resin. The following example is indicative of the bond strength secured:

*Example VIII*

20 grams of the resin of Example I was admixed with 4 grams of a mixture of equal parts by weight of walnut shell flour and paraformaldehyde and sufficient sodium hydroxide to give a pH of 7 to the mixture. The composition was applied to 2 inch by 1 inch rectangular members cut from a ½-inch thick phenolic laminate composed of cloth impregnated with phenolic resin and cured to a smooth, hard surfaced member. Three rectangular members were superimposed, as shown in Fig. 3 of the drawing, with the center member offset ½ inch from the other members and pressed for 24 hours room temperature (24° C.) at 100 p. s. i. clamping pressure. The total bonding area between the center member and the outside members was 3 square inches.

The resulting bonded unit was tested by pressing on the center leg of the unit to determine the shear strength of the adhesive bond. The following gives the average of the values secured from a great number of tests after the respective time and treatments indicated:

Table I

| Time at 24° C. | Time Immersed in Water at 24° C. | Time Immersed in Boiling Water | Shear Strength |
|---|---|---|---|
| Days | Days | Hours | P. s. i. |
| 1 | -------- | -------- | 2,400 |
| 5 | -------- | -------- | 2,950 |
| 5 | 1 | -------- | 3,050 |
| 5 | -------- | 3 | 3,200 |

The best commercially available adhesives tested in a similar manner indicated shear strengths of from 10% to 20% lower under the same test conditions.

Since certain obvious changes may be made in the above procedures and different embodiments of the invention could be made without departing from the scope thereof, it is intended that all matter contained in the above description shall be interpreted as illustrative and not in a limiting sense.

I claim as my invention:

1. The process of producing a resin adhesive highly reactive to a thermoset state at temperatures of the order of 70° F. which comprises reacting under substantially anhydrous conditions one mole of anhydrous polyhydroxy benzene having the following unit formula

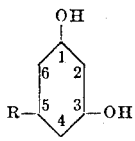

where R is a radical located at the 5 position selected from the group consisting of hydrogen, hydroxyl, carboxyl and saturated aliphatic hydrocarbon radicals and from 0.5 to 0.8 mole of anhydrous aldehyde selected from the group consisting of formaldehyde and its polymers in an anhydrous solvent containing methanol in an amount equal to at least 25% of the total weight of the reactants and the solvent, the reaction being carried out with an alkaline catalyst in an amount of from 0.01% to 1% of the weight of the polyhydroxy benzene to the point where the reaction product is still soluble in the solvent, the reaction product being highly stable, thereafter adding to the solution of the reaction product sufficient of an aldehyde selected from the group consisting of formaldehyde and its polymers to provide a total of from 0.9 to 1.5 moles of aldehyde per mole of polyhydroxy benzene, and adding from 0.1% to 5%, based on the weight of the reaction product, of a hydroxide selected from the group consisting of alkali metal hydroxides and alkaline earth metal hydroxides sufficient to provide a pH of from 6.8 to 9 whereby to render the solution auto-reactive at a temperature of 70° F. to a thermoset state in approximately ¼ hour.

2. The process of producing a resin adhesive highly reactive to a thermoset state at temperatures of the order of 70° F. which comprises reacting under substantially anhydrous conditions one mole of anhydrous resorcinol and from 0.5 to 0.8 mole of anhydrous paraformaldehyde in an anhydrous solvent containing methanol in an amount equal to at least 25% of the total weight of the reactants and the solvent, the reaction being carried out with an alkaline catalyst in an amount of from 0.01% to 1% of the weight of the resorcinol to the point where the reaction product is still soluble in the solvent, the reaction product being highly stable, thereafter adding to the solution of the reaction product sufficient of an aldehyde selected from the group consisting of formaldehyde and its polymers to provide a total of from 0.9 to 1.5 moles of aldehyde per mole of resorcinol, and adding from 0.1% to 5%, based on the weight of the reaction product, of a hydroxide selected from the group consisting of alkali metal hydroxides and alkaline earth metal hydroxide sufficient to provide a pH of from 6.8 to 9 whereby to render the solution auto-reactive at a temperature of 70° F. to a thermoset state in approximately ¼ hour.

3. The process of producing a resin adhesive highly reactive to a thermoset state at temperatures of the order of 70° F. which comprises reacting under substantially anhydrous conditions one mole of anhydrous resorcinol and from 0.5 to 0.8 mole of anhydrous paraformaldehyde in an anhydrous solvent containing methanol in an amount equal to at least 25% of the total weight of the reactants and the solvent, the reaction being carried out with an alkaline catalyst in an amount of from 0.01% to 1% of the weight of the resorcinol to the point where the reaction product is still soluble in the solvent, the reaction product being highly stable, thereafter adding to the solution of the reaction product sufficient of an aldehyde selected from the group consisting of formaldehyde and its polymers to provide a total of from 0.9 to 1.5 moles of aldehyde per mole of resorcinol, up to 100%, based on the weight of the reaction product, of walnut shell flour, and adding from 0.1% to 5%, based on the weight of the reaction product, of a hydroxide selected from the group consisting of alkali metal and alkaline earth metal hydroxide sufficient to provide a pH of from 6.8 to 9 whereby to render the solution auto-reactive at a temperature of 70° F. to a thermoset state in ¼ hour.

4. The method of making a bonded laminated member, comprising superimposing under a pressure of above 10 pounds per square inch a plurality of laminations with a layer of the thermosettable resinous product of 1 mole of resorcinol and from 0.5 to 0.8 mole of paraformaldehyde partially reacted under substantially anhydrous conditions to a solvent soluble, thermoplastic stage in methanol in an amount equal to at least 25% of the weight of the entire reaction mixture in the presence of an alkaline catalyst in an amount equal to from 0.01% to 1% of the weight of the resorcinol, thereafter adding sufficient aldehyde selected from the group consisting of formaldehyde and polymers of formaldehyde to provide a total of from 0.9 to 1.5 moles of aldehyde per mole of resorcinol, and from 0.1% to 5%, based on the weight of the resinous reaction product, of a hydroxide selected from the group consisting of alkali metal and alkaline earth metal hydroxides to provide a pH of from 6.8 to 9, pressure being applied until the resin thermosets.

5. In the method of bonding two members with a resinous adhesive applied to meeting surfaces of the members, the steps comprising applying to the meeting surfaces of both of the members a layer of the resinous reaction product of 1 mole of resorcinol and from 0.5 to 0.8 mole of paraformaldehyde partially reacted under substantially anhydrous conditions to a solvent soluble thermoplastic stage in methanol in an amount equal to at least 25% of the weight of the entire reaction mixture in the presence of an alkaline catalyst in an amount equal to from 0.01% to 1% of the weight of the resorcinol, including in the layer of reaction product on one meeting surface sufficient aldehyde selected from the group consisting of formaldehyde and polymers of formaldehyde, to supply a total of from 0.9 to 1.5 moles of aldehyde per mole of resorcinol in both layers of the reaction product, and including in the other layer of reaction product sufficient hydroxide selected from the group consisting of alkali metal and alkaline earth metal hydroxides to provide from 0.2% to 10% thereof based on the weight of the reaction product in the layer, and bringing the alkali containing and added formaldehyde containing layers into contact with each other whereby they become mutually reactive to produce a thermoset resinous product.

6. A potentially reactive adhesive composition capable of thermosetting in less than a day at temperatures of the order of 70° F. which comprises as its essential ingredients 100 parts by weight of the reaction product obtained by reacting under substantially anhydrous conditions one mole of anhydrous resorcinol and from 0.5 to 0.8 mole of anhydrous paraformaldehyde in anhydrous solvent containing methanol in an amount equal to at least 25% of the total weight of the reactants and the solvent, the reaction being carried out with an alkaline catalyst in an amount of from 0.01% to 1% of the weight of the resorcinol to the point where the reaction product is still soluble in the solvent, the reaction product being highly stable, from 0.1 to 5 parts by weight of a hydroxide selected from the group consisting of alkali metal hydroxides and alkaline earth metal hydroxides, and from 2.4 to 24 parts of paraformaldehyde to provide for from a total of from 0.9 to 1.5 moles of aldehyde per mole of resorcinol.

7. A potentially reactive adhesive composition capable of thermosetting in less than a day at temperatures of the order of 70° F. which comprises as its essential ingredients 100 parts by weight of the reaction product obtained by reacting under substantially anhydrous conditions one mole of anhydrous resorcinol and from 0.5 to 0.8 mole of anhydrous paraformaldehyde in anhydrous solvent containing methanol in an amount equal to at least 25% of the total weight of the reactants and the solvent, the reaction being carried out with an alkaline catalyst in an amount of from 0.01% to 1% of the weight of the resorcinol to the point where the reaction product is still soluble in the solvent, the reaction product being highly stable, from 0.1 to 5 parts by weight of a hydroxide selected from the group consisting of alkali metal hydroxides and alkaline earth metal hydroxides, from 2.4 to 24 parts of paraformaldehyde to provide for from a total of from 0.9 to 1.5 moles of aldehyde per mole of resorcinol, and up to 100 parts by weight of walnut shell flour.

FRITZ J. NAGEL.

REFERENCES CITED

The following references are of record in the file of this patent:

UNITED STATES PATENTS

| Number | Name | Date |
|---|---|---|
| 2,414,414 | Rhodes | Jan. 14, 1947 |
| 2,414,415 | Rhodes | Jan. 14, 1947 |